United States Patent [19]
Rogers

[11] 3,713,105
[45] Jan. 23, 1973

[54] WIDE-BAND, HIGH-FREQUENCY MATRIX SWITCH

[75] Inventor: Stanley Rogers, La Jolla, Calif.

[73] Assignee: General Dynamics Corporation, San Diego, Calif.

[22] Filed: March 29, 1971

[21] Appl. No.: 129,067

[52] U.S. Cl. ....................340/166 R, 179/18 GF
[51] Int. Cl. ....................H04q 1/18
[58] Field of Search ....................340/166 R; 179/18 GF

[56] References Cited

UNITED STATES PATENTS

| | | | |
|---|---|---|---|
| 2,883,467 | 4/1959 | Ketchledge | 179/18 GF |
| 2,936,402 | 5/1960 | Ketchledge | 179/18 GF |
| 2,944,114 | 7/1960 | Ketchledge | 179/18 GF |
| 3,263,225 | 7/1966 | Headle | 340/166 R X |
| 3,354,435 | 11/1967 | Picciano | 340/166 R |

*Primary Examiner*—Harold I. Pitts
*Attorney*—John R. Duncan

[57] ABSTRACT

An improved matrix switch for use in wide-band high frequency applications is disclosed. In this switch, any of a plurality of input buses are connectable through crosspoint switches to any of a plurality of output buses. Features of the invention include the provision of dummy loads on input buses which are not connected to output buses, double-terminated output buses, center fed input buses, centering of the output amplifier along the output bus and isolation of the input transmission line from the switch. These features serve to reduce voltage irregularities on the buses, reduce propagation delay differences through the switch, reduce crosstalk, etc.

5 Claims, 5 Drawing Figures

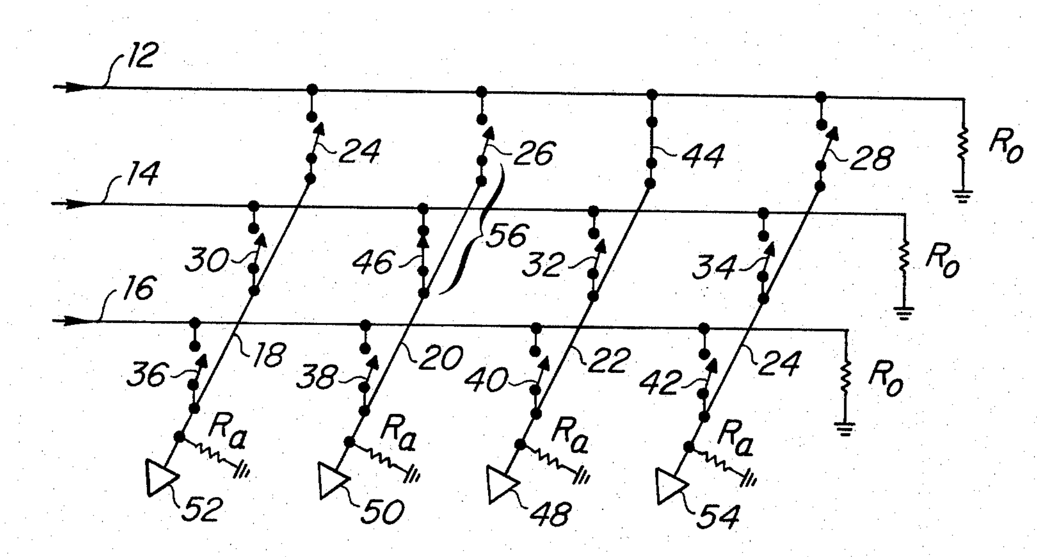
Prior Art
FIG. 1
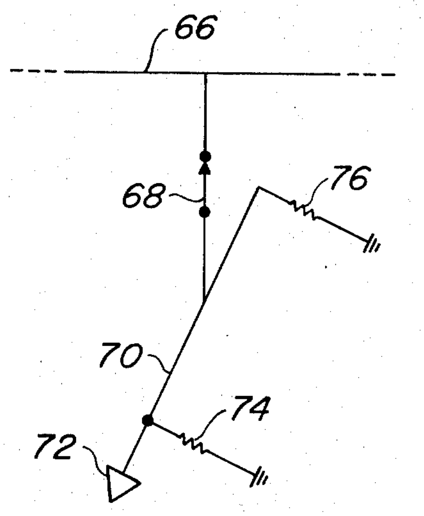
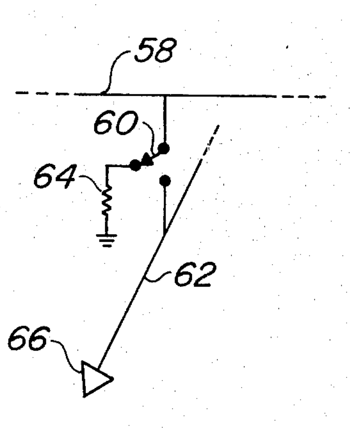
FIG. 2
FIG. 3
INVENTOR.
STANLEY ROGERS
BY John R Duncan
ATTORNEY INVENTOR.
STANLEY ROGERS
BY John R Duncan
ATTORNEY

WIDE-BAND, HIGH-FREQUENCY MATRIX SWITCH

BACKGROUND OF THE INVENTION

Matrix switches generally comprise a rectangular array of switches, one side of the switches being connected to input lines or buses and the other side to output buses. The switch array permits any of the input buses to be electrically connected to any of the output buses, as desired. Conveniently, the input buses are though of as forming the rows of the matrix, with the output buses forming columns. The switches are located at the intersections or crosspoints of the rows and columns.

Matrix switches are widely used in telephony, digital-computer control applications and analog or video transmission systems. Simple switch arrangements, such as the well-known "crossbar" switch are useful in telephony, where low frequencies are used. Also, few problems arise in narrow-band digital matrix switch applications, since the system may be "tuned" for the specific signal frequency to be applied. However, many complex and interrelated problems arise where the matrix switch system must handle very high-frequency broad-band signals such as video or wide-band analog signals.

In broad-band high-frequency matrix switches it is generally desirable to be able to connect from 1 to *n* of the outputs to any one input bus while maintaining a constant signal level at all points on the input bus and providing a constant signal level at the terminus of each output. Desirably, the uniformity of signal levels should not be affected by the number or configuration of the outputs connected to the input bus or by the frequency of the signal. Group delay differences for signals passing through different crosspoints and changes in delay experienced by any given signal as the configuration of closed crosspoints changes should be minimized. The amount of crosstalk between independent circuits through switches should also be minimized.

Ideal matrix switches having all of these characteristics optimized are not available. Generally, it is necessary to accept matrix switches in which only the most critical characteristics for a given application have been optimized. In any event, there is a continuing need for improved matrix switches approaching more nearly the ideal case.

SUMMARY OF THE INVENTION

It is, therefore, an object of this invention to provide a matrix switch which substantially overcomes the above-noted problems.

Another object of this invention is to provide a matrix switch suitable for broad frequency range use at high frequencies.

Another object of this invention is to provide a matrix switch having improved uniformity of voltage along input and output buses.

Another object of this invention is to provide a matrix switch having uniform output signal levels for all frequencies within wide limits.

Still another object of this invention is to substantially eliminate standing waves on the input and output buses of a matrix switch.

Yet a further object of this invention is to provide a matrix switch having a constant propagation delay for all paths through the switch.

The above objects, and others, are accomplished in accordance with this invention by a matrix switch which combines a number of novel circuit features in a novel switch combination.

One novel feature involves the substitution of a dummy load for an unconnected output-system load in a matrix switch. This maintains the shunt impedances unchanged along the input bus of the matrix switch when the number and locations of closed crosspoints are changed. Thus, reflections are minimized, providing maximum voltage uniformity throughout the length of the input bus.

Further advantages are obtained by a novel double-termination arrangement for the output bus in a matrix switch. The end of each output bus is terminated in an impedance-matching resistance, to maintain voltage uniformity along the output bus.

A novel arrangement for feeding input signals to the center of the input buses provides further advantages. This has been found to significantly reduce the adverse effects of signal reflections and the resulting variations in signal voltage along the input bus. The center-fed input bus also reduces the maximum difference in propagation delay through the matrix switch for signals using different crosspoints.

These features, when combined with other features as described in detail below, result in a matrix switch capable of operating within broad frequency bands and at very high frequencies. This improved switch virtually eliminates standing waves on the input and output buses. With a given level of input signal, the output signal is substantially identical for all frequencies and paths through the switch. Crosstalk is reduced to a negligible level. Propagation delay is substantially equal for all paths through the switch. Any reasonable number of outputs may be paralleled on any input.

While this invention is useful over a wide range of frequencies, it is generally of maximum benefit in applications involving frequencies over 50 MHz. In many cases, this invention has highly desirable advantages at frequencies over 100 MHz and in applications involving a very wide range, e.g., from a few cycles per second to over 50 MHz.

BRIEF DESCRIPTION OF THE DRAWING

Details of the invention, and of preferred embodiments thereof, will be further understood upon reference to the drawing, wherein:

FIG. 1 is a schematic representation of the basic prior art matrix switch illustrating problems overcome by this invention;

FIG. 2 is a schematic representation of a portion of a matrix switch illustrating the added dummy load;

FIG. 3 is a schematic representation of a portion of a matrix switch illustrating the use of a double-terminated output bus;

DETAILED DESCRIPTION OF THE INVENTION

Figure 4:
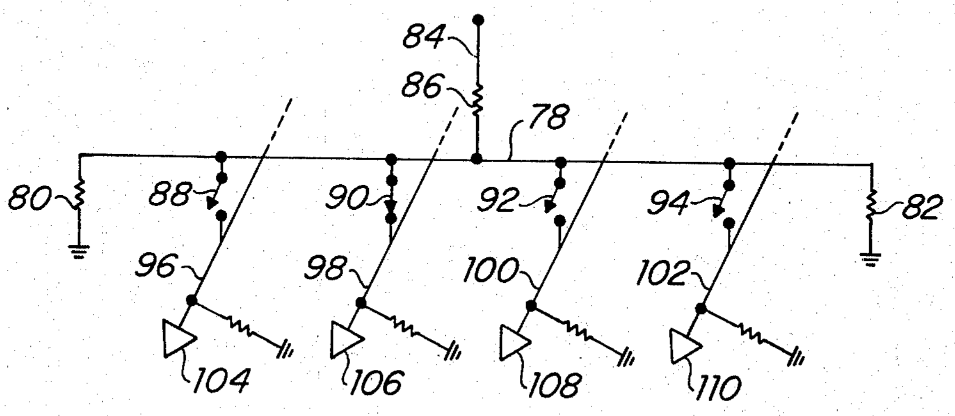
FIG. 4 is a schematic representation of a portion of a matrix switch illustrating the center-fed input bus.

Referring now to FIG. 1, there is seen a simple schematic representation of a matrix switch in which the present invention can be applied. The inventive features, as shown in FIGS. 2–5 replace or add to portions of the switch of FIG. 1. The inventive features are shown in the form of single switch elements and single input and output buses in FIGS. 2–4, since to show an entire switch (as in FIG. 1) incorporating these novel features at every crosspoint would be unduly confusing because of the large number of circuit elements and because the complex three-dimensional array must be illustrated in two dimensions.

As shown in FIG. 1, a typical matrix switch comprises a number of input lines or buses 12, 14 and 16 and a number of output lines or buses 18, 20, 22 and 24. The input and output buses are conveniently illustrated as rows and columns, respectively. Of course, more or fewer input and output buses may be included, as desired.

Wherever input and output buses cross, an interconnecting crosspoint switch is provided. Any of the input buses thus may be connected to any of the output buses. As seen in FIG. 1, crosspoint switches 24, 26, 28, 30, 32, 34, 36, 38, 40 and 42 are open while switches 44 and 46 are closed. Thus, a signal entering on input bus 12 will pass through crosspoint switch 44 and reach output amplifier 48 on output bus 22. Similarly, a signal entering on input bus 14 will pass through crosspoint switch 46 and output bus 20 to output amplifier 50. Since none of switches 24, 30 and 36 are closed, no signal (except crosstalk) will reach output amplifier 52. Similarly, with switches 28, 34 and 42 all open, no signal will reach output amplifier 54. Also, since none of switches 36, 38, 40 and 42 are closed, a signal entering on input bus 16 will not reach an output amplifier.

Each input bus is terminated in a matching resistor $R_o$, which is equal to the characteristic impedance of the line. Where the input bus is thus "matched," no signal energy is reflected back from the termination toward the input end of the bus. Such a bus has the desirable characteristic of having the same voltage at all points along the bus when a constant signal is applied at the input.

As seen in FIG. 1, each input bus is properly terminated so that no signal energy is reflected from $R_o$ back toward the source of energy, so long as all crosspoint switches are open, as is the case with input bus 16.

However, a line terminated in anything other than its characteristic impedance will have "standing waves" on it, resulting from signal energy reflections from a mismatched termination. If the impedance changes at any point along a transmission line, reflections of signal energy will occur at each such point, setting up standing waves on the line.

When a crosspoint switch is closed, an output bus is added to the circuit. For example, when switch 46 is closed, output bus 20 and amplifier input impedances $R_a$ are added to the circuit of input bus 14. $R_a$ is very much greater than $R_o$ and hence has only a small effect. However, the bracketed portion 56 along output bus 20 is an unterminated "stub." The resulting standing waves caused by signal energy reflected from the end of stub portion 56 cause voltage non-uniformity along input bus 14 and output bus 20. Thus, as the number and lengths of stubs and the number of $R_a$'s connected to the input bus changes as different crosspoint switches are opened and closed, the signal reaching the output amplifiers will be changed in amplitude, i.e., distorted.

Short transmission lines or stubs with standing waves on them are effectively inductive or capacitive reactances. The velocity of propagation along a transmission line decreases when capacitance or inductance increases. Desirably, of course, propagation time through a matrix switch should be constant for any path and the voltages should not vary along the lines. To achieve these results, reflections must be avoided by requiring that the signal always "see" impedances that match the characteristic impedance of the bus, all path lengths must be the same, and the propagation velocity must be held constant.

Depending upon the route a signal takes, the propagation time will vary with the electrical length of the path, which depends on the physical length and on the velocity of propagation. As seen in FIG. 1, the path through input bus 12, crosspoint switch 28, and output bus 24 to output amplifier 54 would have greater physical length than the path through input bus 16, crosspoint switch 36 and output bus 18 to amplifier 52. It would be preferable to have more nearly equal paths, or to correct for the difference, so that the delay in the switch would be equal for all paths.

In a matrix switch such as that shown in FIG. 1, "crosstalk" may occur. This is signal energy that "leaks" through open crosspoint switches. Typically, some signal energy may pass through switch 24 (even though it is open) from input bus 12 and reach output amplifier 52, or through switch 32 from output bus 22 to input bus 14. Crosstalk will distort the desired signal at the amplifier by adding weak signals from other circuits to it. To keep crosstalk low, the impedance of the open crosspoint switches must be high and the impedance of the bus receiving the crosstalk must be low.

The various inventive features shown in FIGS. 2–5 substantially overcome these problems when incorporated into the matrix switch of FIG. 1. While each of the circuit features is useful independently, best overall results are achieved with the combination shown in FIG. 5.

Referring now to FIG. 2, there is seen a portion of an input bus 58 adjacent to one crosspoint switch 60 and a portion of the output bus 62 to which switch 60 connects. Of course, an output bus may not be connected to more than one input bus since this would connect signals from different sources to one output.

In this embodiment, switch 60 is a single-pole, double-throw, low-capacitance switch. When the output bus at the crosspoint is not connected to the input bus, switch 60 connects an equivalent dummy load 64 in its place, thus maintaining the load on the input bus constant. The impedance of dummy load 64 is selected to be equal to the impedance of the actual load, i.e., output amplifier 66 and impedances associated with it. With this arrangement, switching does not affect the voltages along the input bus. With constant shunt impedance at the crosspoints, the input bus can be designed for minimum reflections and, consequently, for maximum uniformity of voltage throughout its length.

Another novel feature of this invention is illustrated in FIG. 3. A portion of an input bus 66 adjacent to one crosspoint switch 68 which connects to output amplifier 72 through output bus 70 is shown. Other crosspoints along output bus 70 are omitted from this illustration, for clarity.

In the usual matrix switch, the output buses are terminated at one end only. There, the portion of the bus between a connected crosspoint and the unterminated end constitutes an unterminated stub (for example, bracketed portion 56 of output bus 20 in FIG. 1) which at high frequencies will produce a strong signal reflection.

It has been found that this effect can be overcome by terminating each end of the output bus 70 in impedance-matching resistances 74 and 76. The characteristic impedance of output bus 70 must be twice that which would be required if the bus had the conventional single termination since, at the point where the signal enters output bus 70 from crosspoint switch 68, it sees two paths of equal impedance. These paths are effectively in parallel and half the signal goes each way. When the two half-energy signals reach the ends of output bus 70, they are fully absorbed in the terminating resistors. Therefore, no signal energy is reflected and the voltage at all points on the bus must be the same.

FIG. 4 illustrates another novel feature of the present invention. One complete input bus 78 is shown, with terminating resistors 80 and 82. The signal enters at the center of input bus 78 through line 84 and resistor 86. Resistor 86, in combination with the two branches of input bus 78 and terminating resistors 80 and 82, forms a voltage divider and input-bus impedance reducer. Resistor 86 isolates any reflections that may occur on the input bus from input line 84. The matching resistors 80 and 82 prevent reflections from the ends of the input bus, the lowered impedance on input bus 78 provides improved crosstalk isolation, and greater immunity to the effects of adding output buses and the impedances associated with them to the input bus.

The signal passes from input bus 78 through any of crosspoint switches 88, 90, 92 and 94, to any of output buses 96, 98, 100 and 102 and eventually to any of output amplifiers 104, 106, 108 and 110.

This center-fed input bus has the advantage that the maximum differential propagation delay through the matrix switch is smaller than if the input bus is fed at any other point, since the difference between the longest and shortest paths from the input to the amplifiers is a minimum.

Figure 5:
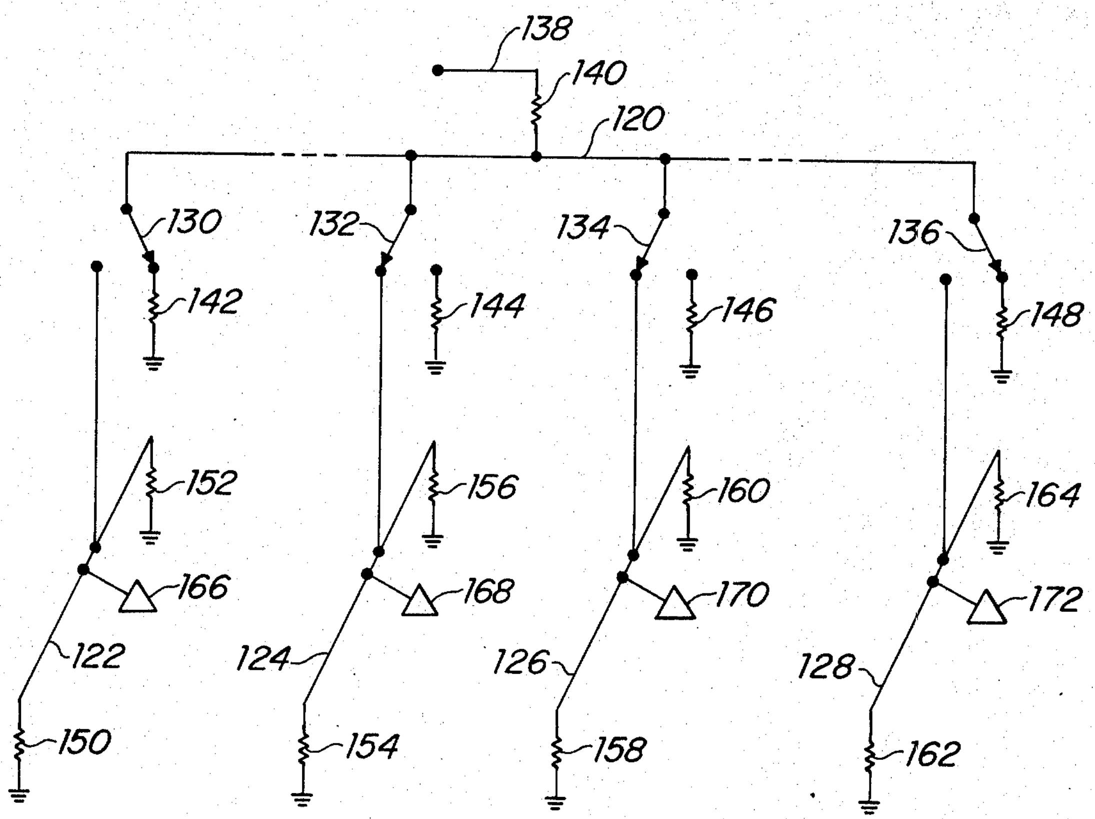
FIG. 5 is a schematic representation of a portion of a matrix switch illustrating a preferred overall combination of features according to this invention.

The above features may be combined to produce an exceptionally effective matrix switch, as illustrated in FIG. 5. A single input bus 120, connectable to any one of four output buses 122, 124, 126 and 128 through crosspoint switches 130, 132, 134 and 136, is shown in FIG. 5, for clarity. In an actual matrix switch any suitable number of input and output buses may be used.

As seen in FIG. 5, the signal enters on input line 138, which feeds the center of input bus 120 through isolating resistor 140. The crosspoint switches 130, 132, 134, 136 direct the signal to either the appropriate output bus, or to dummy loads 142, 144, 146 and 148.

Each output bus is double-terminated with resistors matching the impedance of the output bus and having twice the resistance of the dummy loads. Output bus 122 is terminated in resistors 150 and 152; bus 124 in resistors 154 and 156; bus 126 in resistors 158 and 160; and bus 128 in resistors 162 and 164. Signals on each output bus also reach output amplifiers 166, 168, 170 and 172.

Each of the output amplifiers 166, 168, 170 and 172 is preferably connected to the appropriate output bus at the center of the bus. This location reduces the maximum propagation time for signals to reach the output amplifier from the most distant crosspoint on the output bus and provides more nearly equal propagation time for the various paths through the matrix switch.

In operation, the incoming signal arrives on input line 138 from a transmission line having some particular characteristic impedance (such as 50 or 75 ohms). Isolating resistors 140 in series with the parallel combination of resistors 142, 144, 146 and 148 exactly equals the characteristic impedance of the transmission line, thus preventing reflection of signal energy with the consequent formation of standing waves on the input line. This is unaffected by the connection or disconnection of any of the crosspoint switches from the output buses, since the output buses 122, 124, 126 and 128 effectively have the same impedance as the dummy loads 142, 144, 146 and 148. The output buses have a characteristic impedance equal to twice the resistance of dummy load resistors 142, 144, 146 and 148, and the terminating resistors on output buses 122, 124, 126 and 128 combine to match the impedance of the output buses, thus preventing standing waves on the output buses.

In the event that stray capacitances associated with the output buses are present, identical capacitors may be placed in parallel with dummy loads 142, 144, 146 and 148, if desired.

Switches 130, 132, 134 and 136 may be single-pole, double-throw, low-capacitance switches. If desired, pairs of single-pole, single-throw, low-capacitance switches may be used, or more complicated crosspoint switching schemes may be used to reduce crosstalk.

Preferably, input buses 120 are made electrically short enough so that half the crosspoints may be regarded as in parallel at each end of the bus, so that the impedance of the input bus may be made equal to twice the resistance of all the dummy loads 142, 144, 146 and 148 in parallel. If the input buses 120 are long enough that any of the sections between crosspoints must be regarded as a transmission line, then it is preferred that the input bus be designed in the manner disclosed in copending U. S. Pat. application Ser. No. 127,087 filed concurrently herewith.

In the matrix switch as shown in FIG. 5, the input from the transmission line (not shown) feeding signals to input line 138 is correctly matched by the input impedance of input line 138. This match is very little affected by any mismatch that may occur later in the circuit because resistor 140 attenuates the effect of any standing waves that might appear on the input bus as a result, for example, of stray capacitance.

The loading on input bus 120 is the same for all configurations of the crosspoint switches 130, 132, 134 and 136, and is unaffected by changes in connections to the output buses. Since input bus 120 is fed by input line 138 at the center of the bus, the maximum propagation time for signals to reach the most distant crosspoint on the input bus is minimized. Crosstalk is reduced by the low impedance of the input buses.

Double-terminated output buses 122, 124, 126 and 128 have no reflection of energy from their ends; hence standing waves are not formed, and the relative amplitude of the output signal is not affected by the position of the crosspoint along the output bus.

The location of the output amplifiers 166, 168, 170 and 172 at the centers of the output buses 122, 124, 126 and 128, respectively, reduces the maximum propagation time for signals to reach the output amplifiers from the most distant crosspoint on the output bus.

In a typical matrix switch of the sort shown in FIG. 5, the signal might be received by input line 138 from a 50-ohm transmission line. The characteristic impedance of line 138 would then be 50 ohms and resistor 140 could be 40 ohms. If there are just four crosspoints along bus 120, for proper matching, resistors 142, 144, 146 and 148 would also be 40 ohm resistors. The output bus impedance is then twice 40 ohms or 80 ohms, and each of resistors 150, 152, 154, 156, 158, 160, 162 and 164 is 80 ohms. This arrangement would require an amplifier gain of 5 (14dB).

While the novel features shown in FIGS. 2–4 may each be independently incorporated in matrix switch systems, best results are obtained when all are used together, as shown in FIG. 5. Specific advantages of the several features complement each other, and minor disadvantages of some of them when used alone are overcome by the combination.

Although specific components, combinations, and proportions have been described in the above description of the invention, other arrangements of the novel features may be used, where suitable, with similar results. Other modifications and ramifications of the present invention will occur to those skilled in the art upon reading the present disclosure. These are intended to be included within the scope of this invention, as defined in the appended claims.

I claim:

1. A wide-band, high-frequency, matrix switch comprising:

a. a plurality of input buses;

b. a plurality of output buses adjacent to said input buses;

c. a plurality of crosspoint switches adapted to selectively connect at least some of said input buses to at least some of said output buses, each of said switches movable between a first position connecting an input bus to an out-put bus and a second position connecting an input bus to a dummy load, said dummy load having an impedance substantially equal to the impedance of the output bus; and d. output means connecting each of said output buses to an output amplifier, each of said output means connected to substantially the center of each output bus.

2. The matrix switch according to claim 1 wherein each end of each output bus is terminated in an impedance-matching resistance.

3. The matrix switch according to claim 1 further including input means for feeding signals to each input bus, each of said input means being connected to substantially the center of each input bus.

4. A wide-band, high-frequency matrix switch comprising a plurality of input buses; a plurality of output buses adjacent to said input buses and a plurality of crosspoint switches adapted to selectively connect at least some of said input buses to at least some of said output buses; each end of each of said output buses terminated in an impedance-matching resistance; each output bus connected to an output amplifier by an output means connected to substantially the center of each output bus.

5. A wide-band, high-frequency matrix switch comprising:

a. a plurality of input buses;

b. input means for feeding signals to substantially the center of each input bus;

c. a plurality of output buses, adjacent to said input buses;

d. impedance-matching resistance means terminating each end of each of said output buses;

e. a plurality of crosspoint switches adapted to selectively connect at least some of said input buses to at least some of said output buses; each of said switches movable between a first position connecting an input bus to an output bus and a second position connecting the input bus to a dummy load which has an impedance substantially equal to the impedance of the output bus; and f. output means connected to substantially the center of each output bus to receive a signal therefrom.

* * * * *